April 19, 1966     E. M. POWELL ETAL     3,247,069
CONTROL OF NUCLEAR POWER PLANT
Filed July 13, 1960     4 Sheets-Sheet 1

CONSTANT PRESSURE OPERATION

INVENTORS.
ELNO M. POWELL &
JOHN I. ARGERSINGER
BY
their ATTORNEYS

April 19, 1966 E. M. POWELL ETAL 3,247,069
CONTROL OF NUCLEAR POWER PLANT
Filed July 13, 1960 4 Sheets-Sheet 2

INVENTORS.
ELNO M. POWELL &
BY JOHN I. ARGERSINGER their ATTORNEYS

April 19, 1966  E. M. POWELL ETAL  3,247,069
CONTROL OF NUCLEAR POWER PLANT
Filed July 13, 1960  4 Sheets-Sheet 3

INVENTORS.
ELNO M. POWELL &
BY  JOHN I. ARGERSINGER their ATTORNEYS

April 19, 1966  E. M. POWELL ETAL  3,247,069
CONTROL OF NUCLEAR POWER PLANT
Filed July 13, 1960  4 Sheets-Sheet 4

INVENTORS.
ELNO M. POWELL &
BY JOHN I. ARGERSINGER their ATTORNEYS

United States Patent Office 3,247,069
Patented Apr. 19, 1966

3,247,069
CONTROL OF NUCLEAR POWER PLANT
Elno M. Powell, Chappaqua, and John I. Argersinger, Scarsdale, N.Y., assignors to Combustion Engineering, Inc., New York, N.Y., a corporation of Delaware
Filed July 13, 1960, Ser. No. 42,574
12 Claims. (Cl. 176—20)

This invention relates to nuclear power plants, and more particularly, to a method and apparatus for regulating the power output of a nuclear plant.

Nuclear power plants of the type contemplated are those comprising a nuclear reactor having a negative temperature coefficient, a reactor coolant circuit by which the reactor is cooled, a working fluid circuit from which the plant power output is derived, and means such as a heat exchanger linking the reactor coolant circuit with the working fluid circuit. Other plant components may be involved, but the above are the basic components with which the invention is concerned.

Part of the large expense involved in constructing nuclear power plants is due to the extensive and complicated control systems required to make the plants safe and to accommodate for changes in the load demand on the plant. In fact, the controls required have often been prohibitively expensive, particularly in the case of small plants, and particularly in the control of the nuclear reactor and the reactor coolant circuit.

Accordingly, it is a purpose of the present invention to provide a method and apparatus for controlling a nuclear power plant for adjusting the plant power output level as desired, or automatically as the case may be, in response to a variation in the power demand on the plant, without the manipulation of external controls of the nuclear reactor and of the reactor coolant circuit.

This purpose, in one embodiment, is attained by providing apparatus and a method of controlling the power output of a nuclear power plant having a negative temperature coefficient, involving the steps of detecting a variation in the load demand of the plant, and automatically changing by an amount proportional to the variation in the load demand a characteristic or characteristics of the flow in the working fluid circuit in a manner whereby the change in characteristic or characteristics of the working fluid acts through the reactor coolant to adjust the power level of the nuclear reactor in proportion to the variation in the load demand on the plant. Alternatively, if it is not necessary or desired to follow automatically a varying load requirement, the system may involve means whereby the power output of the plant is regulated or changed at the discretion of an operator by changing in proportion to the change in desired output, a characteristic or characteristics of the working fluid in the same manner and with the same affect as just described.

The characteristics of the working fluid flow which may be involved in the working fluid circuit are the flow rate of the working fluid in the circuit, and particularly in the heat exchanger, and the temperature, degree of superheat, and the pressure of the working fluid in the circuit' A change in characteristic or characteristics of the working fluid may involve a change in flow rate in the heat exchanger at a constant pressure in the conduit leading from the heat exchanger thus providing a proportional increased or decreased flow rate to the power consuming means, or it may involve a variation in pressure in the conduit leading from the heat exchanger and increased flow rate in the entire system to compensate for a change in load demand. On further consideration of the specification, other ways in which a characteristic or characteristics may be varied will become apparent, the principle being however, to vary the energy or heat flow from the working fluid to the power consuming means, and correspondingly draw a greater or lesser energy or heat flow from the reactor coolant circuit to the working fluid circuit.

A reactor which has a negative temperature coefficient, a characteristic which is well known, is one wherein the reactor coolant fluid acts as a moderator in the reactor and the rate of reaction varies inversely with the temperature of the coolant. If the rate of flow of the coolant is maintained constant and the temperature of the coolant entering the reactor is lowered, the heat output of the reactor increases, causing the temperature of the coolant leaving the reactor to rise. Consequently, the average temperature of the coolant fluid inside the reactor remains constant regardless of the change in heat flow from the reactor coolant circuit to the working fluid circuit. Accordingly, when the load on the working fluid circuit is increased, more heat is taken from the reactor coolant circuit, and through the above described mechanism, the nuclear reactor reaction rate is automatically regulated for a particular load demand without the necessity of external and expensive controls on the reactor and reactor coolant circuit.

This invention can be more completely understood from the following detailed description taken in conjunction with the accompanying figures of the drawings in which.

For purposes of this application, the working fluid circuit shall be described as the secondary flow circuit of a heat exchanger boiler means, the primary flow circuit being the nuclear reactor coolant circuit. It is of course understood that other arrangements may be used incorporating the principles of the invention, such as, for example, the use of a tertiary circuit in combination with two heat exchangers. In such an arrangement, the working fluid circuit would be the tertiary flow circuit, with the primary flow circuit containing the nuclear reactor coolant. In the following description, the terms primary and secondary are used somewhat interchangeably with the terms reactor coolant and working fluid, but it is to be understood that other arrangements of flow circuits and heat exchanger means are known in the art, and within the scope of the invention.

Figure 1:
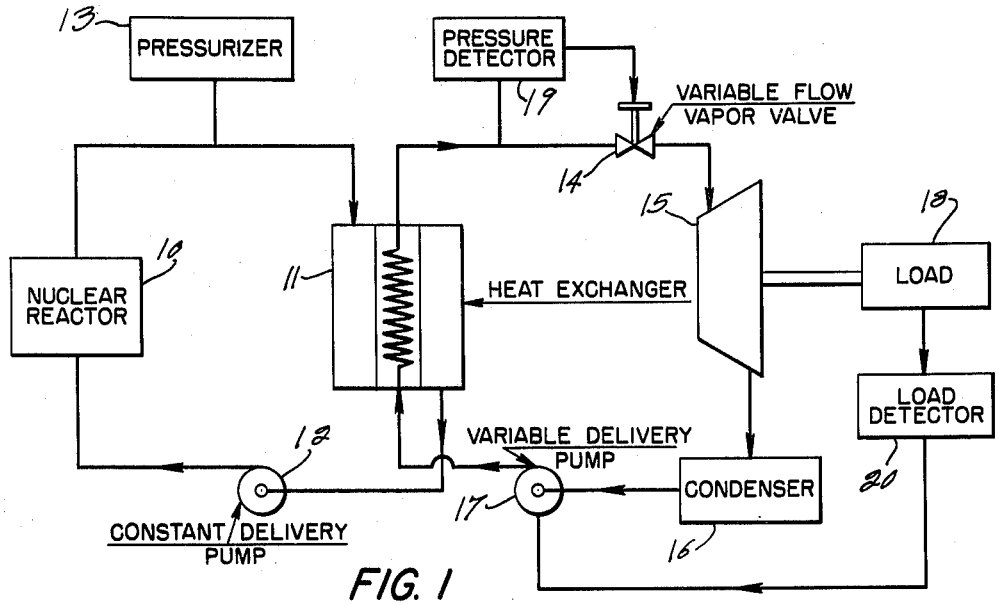
FIGURE 1 is an illustration of a nuclear power plant having a control system constructed to operate in accordance with the invention.

With reference to the nuclear power plant illustrated schematically in FIGURE 1, the primary flow circuit or reactor coolant circuit includes a nuclear reactor 10 that is connected to the primary side of a heat exchanger 11 and to a constant delivery pump 12. The pump causes primary or reactor coolant fluid to flow, under pressure, at a constant rate through the nuclear reactor 10 and the heat exchanger 11, the pressure being applied by a pressurizer 13.

A conduit connects the secondary side of the heat exchanger 11 through a variable flow vapor valve 14 to a turbine 15. The return conduit from the turbine 15 connects to a standard condenser 16 and a variable delivery pump 17. Connected to the shaft of the turbine is a power consuming device 18 which may be a conventional electric generator or any other rotating mechanism. It should be understood that the power producing system need not feed a turbine load as shown, because it can also be connected to heating systems for buildings or may be used in other equivalent situations requiring heat energy.

The control apparatus for the system includes a pressure detector 19 that is connected to vary the vapor flow through the valve 14 in response to a variation in the pressure in the secondary conduit or working fluid circuit in such a manner as to maintain the pressure in the conduit or circuit at a constant value. A load detector 20, the specific structure of which will vary with the type of load on the system, is connected to be sensitive to the load demand on the system and to adjust the variable delivery pump 17 so that it varies directly with the load.

The nuclear reactor 10 is designed to have a negative temperature coefficient, so that, with constant primary coolant flow, the average temperature of the coolant, in the reactor, remains constant regardless of variations in the power output of the reactor and the system. This characteristic is well known in the art and is illustrated by the curves shown in FIGURE 2. As the power output of the system increases, the temperature of the primary fluid entering the nuclear reactor 10 decreases approximately linearly, and, since the reactor has a negative temperature coefficient, this drop in the temperature of the coolant fluid entering the reactor causes the rate of reaction to increase. Consequently, a greater quantity of heat is produced and, since the rate of flow of the coolant fluid through the reactor remains constant, the temperature of the coolant fluid at the outlet of the nuclear reactor increases by an amount proportional to the decrease in the fluid temperature at its inlet. The result is that the average temperature of the fluid in the reactor remains constant.

Assuming that the system is initially producing power at a constant rate and that the load demand on the system is suddenly increased, this increase is sensed by the load detector 20 which acts to increase the rate of flow of the working fluid to the heat exchanger 11. The increased amount of working fluid in the heat exchanger causes a great quantity of heat to be extracted from the coolant fluid passing through the exchanger, with the result that the temperature of the fluid entering the reactor 10 decreases by an amount proportional to the increase in the load. As previously explained, this decrease in the coolant fluid temperature at the reactor inlet causes the outlet coolant fluid temperature to increase and supply a greater quantity of heat to the working fluid flowing through the heat exchanger. This, in turn, causes the temperature of the working fluid at the heat exchanger outlet to increase and, temporarily, the vapor pressure in the working fluid circuit also increases. This increase in vapor pressure is sensed by the pressure detector 19 which opens the variable flow vapor valve a small amount and returns the vapor pressure in the conduit to the desired value. The rate of flow of the vapor from the heat exchanger to the turbine thus increases, which enables it to pick up the increased load.

Figure 2:
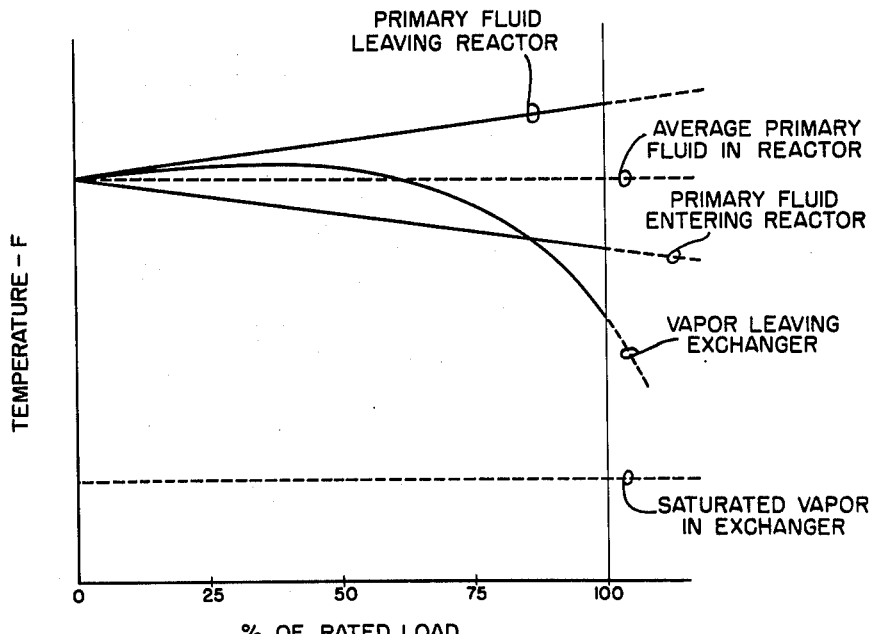
FIGURE 2 is a group of curves that illustrate the operation of the system shown in FIGURE 1.

FIGURE 2 also illustrates the variation in the temperature of the vapor in the secondary flow or working fluid circuit relative to the power output of the system. Since the pressure in the working fluid circuit is maintained substantially constant, the temperature of the saturated vapor in the heat exchanger is also maintained substantially constant. The temperature of the secondary vapor entering the turbine decreases, of course, as the load is increased and a greater quantity of heat is taken from the vapor.

Figure 3:
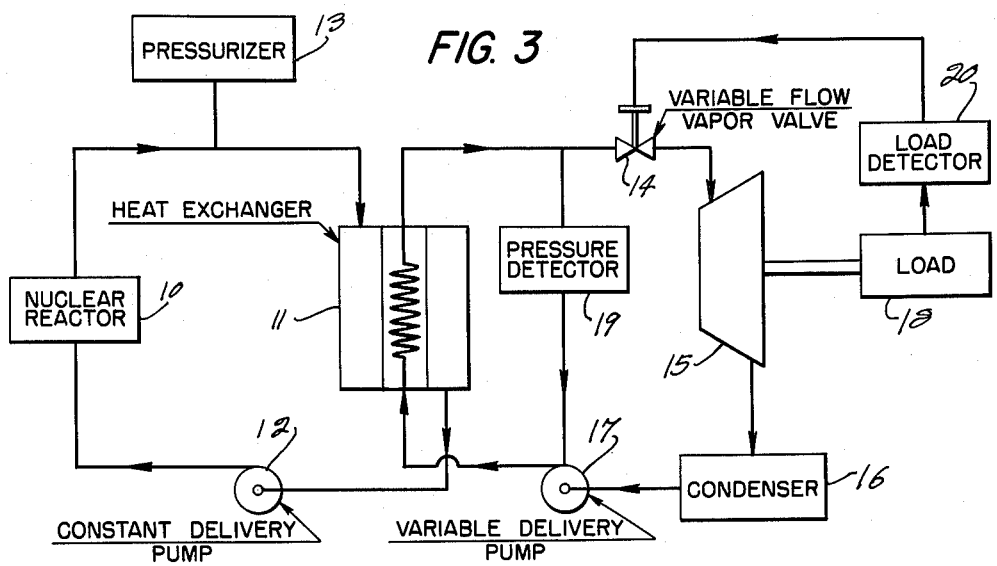
FIGURES 3–7 illustrate control systems constructed in accordance with other embodiments of the invention.

The embodiment of the invention illustrated in FIGURE 3 is similar to that illustrated in FIGURE 1. The difference between the two systems is that the variable flow vapor valve 14 is actuated directly in response to a change in the load demand on the system rather than to a change in the pressure in the conduit, and the variable delivery pump 17 is connected to act in response to a change in the pressure in the working fluid circuit. This system has an advantage over the prior system in that it is able to regulate the power output more accurately and quickly because a variation in the load demand immediately results in a change in the rate of vapor flow to the turbine 15. If the rate of flow in the working fluid circuit is increased by opening the valve 14 in response to an increase in the load, the pressure in the circuit drops momentarily which causes the rate of flow of feedwater to the heat exchanger 11 to be increased by the pump 17.

In both of the embodiments illustrated in FIGURES 1 and 3, the pressure of the vapor in the working fluid circuit is maintained substantially constant and the flow rate of the vapor and its temperature are varied. In the embodiments illustrated in FIGURES 4 and 5, the flow rate and the pressure of the vapor are varied while either the temperature of the vapor or the degree of super-heat are maintained constant.

Figure 4:
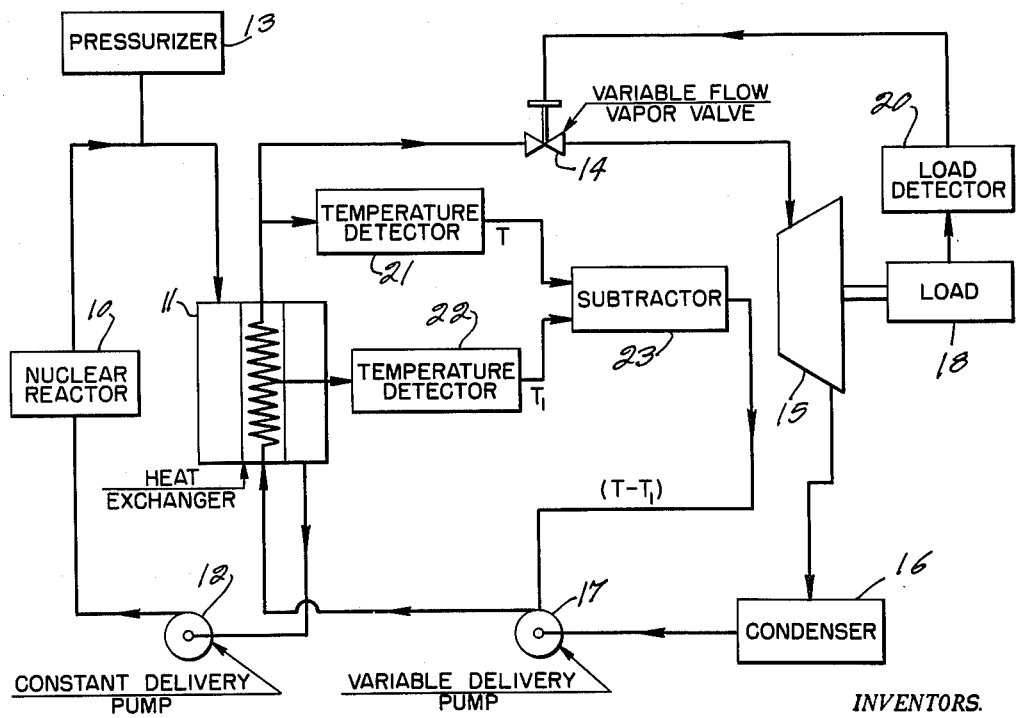

In the system illustrated in FIGURE 4, the degree of superheat is maintained constant by connecting a first temperature detector 21 to the working fluid circuit outlet of the heat exchanger 11 and a second temperature detector 22 to a point in the heat exchanger where it detects the temperature of the working fluid before it is superheated. The outputs from these two temperature detectors, which may be in the form of electrical voltages or other signals, are fed into a subtractor mechanism 23 which provides an output representative of the difference between the two temperatures. This output from the subtractor 23, which is in effect the degree of superheat, is connected to the variable delivery pump 17 in such a manner that the rate of flow of the feedwater into the heat exchanger 11 is increased if the degree of superheat increases.

The load detector 20, which provides a signal representative of the load demand on the system, is connected to control the setting of the variable flow valve 14 in such a manner as to increase the rate of flow of the vapor to the turbine in response to an increase in the load demand on the system.

If the load demand on the system is suddenly increased, the variable flow vapor valve 14 is opened and the rate of flow of the vapor to the turbine 15 is increased enough to take up this increased demand. This increased flow decreases the pressure and saturation temperature, and thus increases the superheat temperature of the working fluid within the heat exchanger. The resulting increase in superheat is only momentary, however, because it is sensed by the two temperature detectors 21 and 22, which act through the subtractor to increase the rate of flow of the feedwater to the heat exchanger and thus the pressure within the exchanger in order to restore the degree of superheat to its desired value.

If desired, this system can be connected to keep the temperature of the working fluid at a constant value rather than to maintain the degree of superheat constant. This can be accomplished simply by removing the temperature detector 22 and the subtractor mechanism 23 and connecting the temperature detector 21 directly to the variable delivery pump 17 in such a manner that the rate of flow of the feedwater will be increased in response to an increase in the temperature of the working vapor. In this instance, all the other connections are identical to those described for the constant degree of superheat operation.

Figure 5:
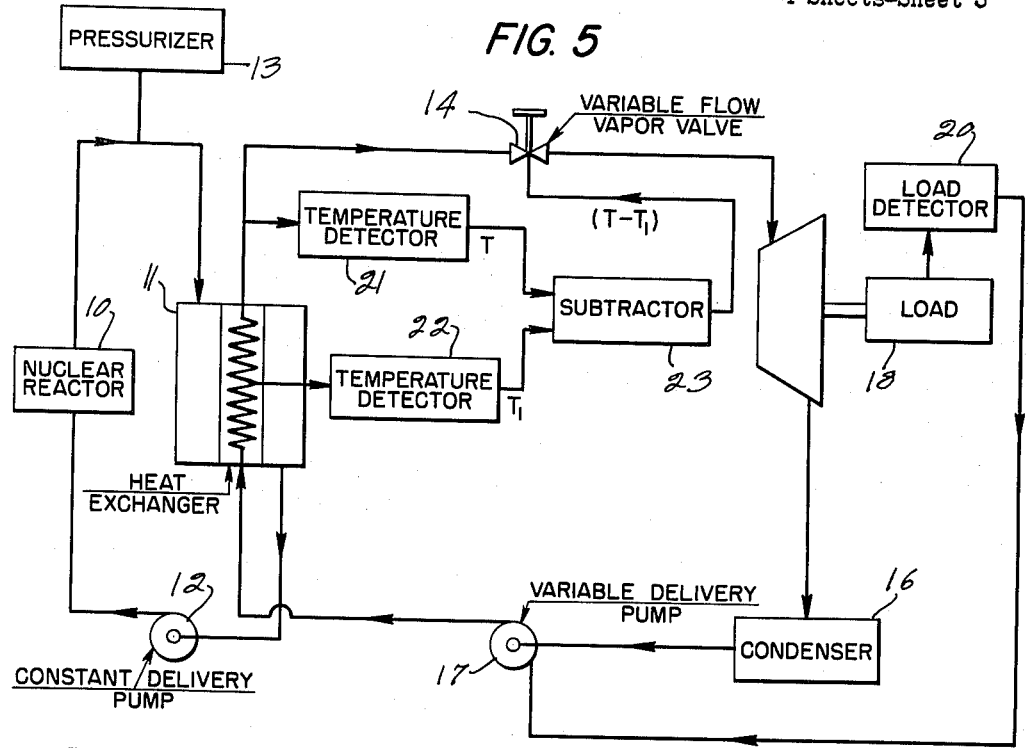

In the embodiment illustrated in FIGURE 5, the variable flow vapor valve 14 is connected to be responsive to the subtractor mechanism 23 which indicates a variation in the degree of superheat, and the variable delivery pump 17 is connected to be responsive to a variation in the load demand on the system. In the operation of this system, an increase in the load demand increases the rate of flow of the working fluid to the heat exchanger 11 which increases the vapor output of the heat exchanger. Consequently, the pressure and saturation temperature of the working fluid within the heat exchanger are also increased. The resulting decrease in superheat is again only momentary, however, because it is detected by the temperature detectors which act to increase the rate of flow of the vapor through the variable flow vapor valve to the turbine which restores the degree of superheat to its desired value.

Once again, this system can be made responsive to the temperature of the working vapor alone rather than to the degree of superheat simply by eliminating the temperature detector 22 and the subtractor mechanism 23 and connecting the temperature detector 21 directly to the variable flow vapor valve 14. In this case, an increase in the load demand on the system increases the rate of flow of the working fluid to the heat exchanger 11 which causes an increase in the outlet temperature of the working fluid and, subsequently, an increase in the rate of flow of the vapor through the valve to restore the outlet temperature of the working fluid to the desired value.

It should be understood that the heat exchanger 11 referred to in the application may be either a boiler of the recirculating type, or a once-through boiler, or other comparable boilers embodying the concepts set forth in the specification.

Figure 6:
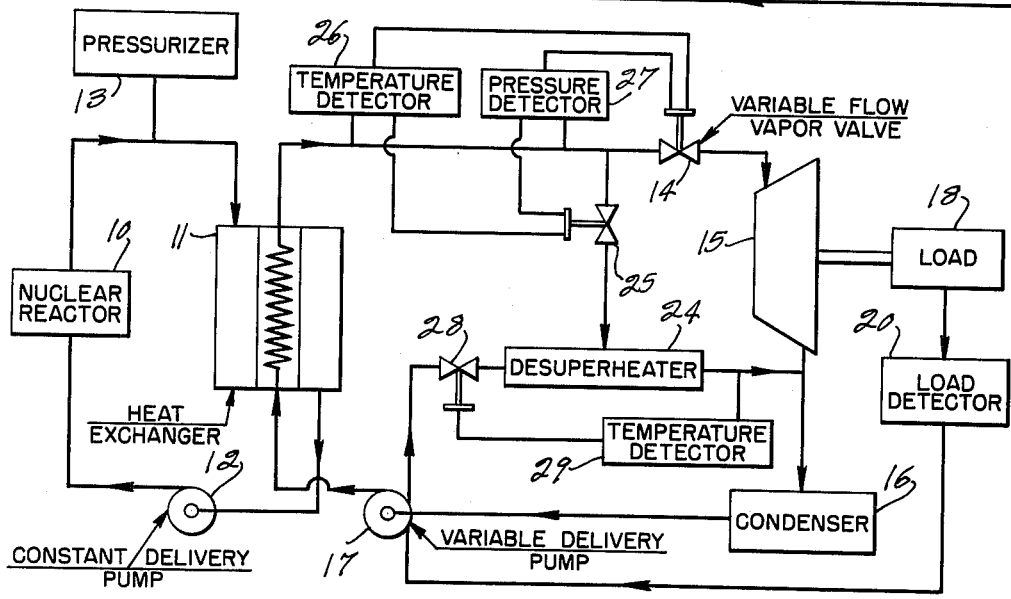
Figure 7:
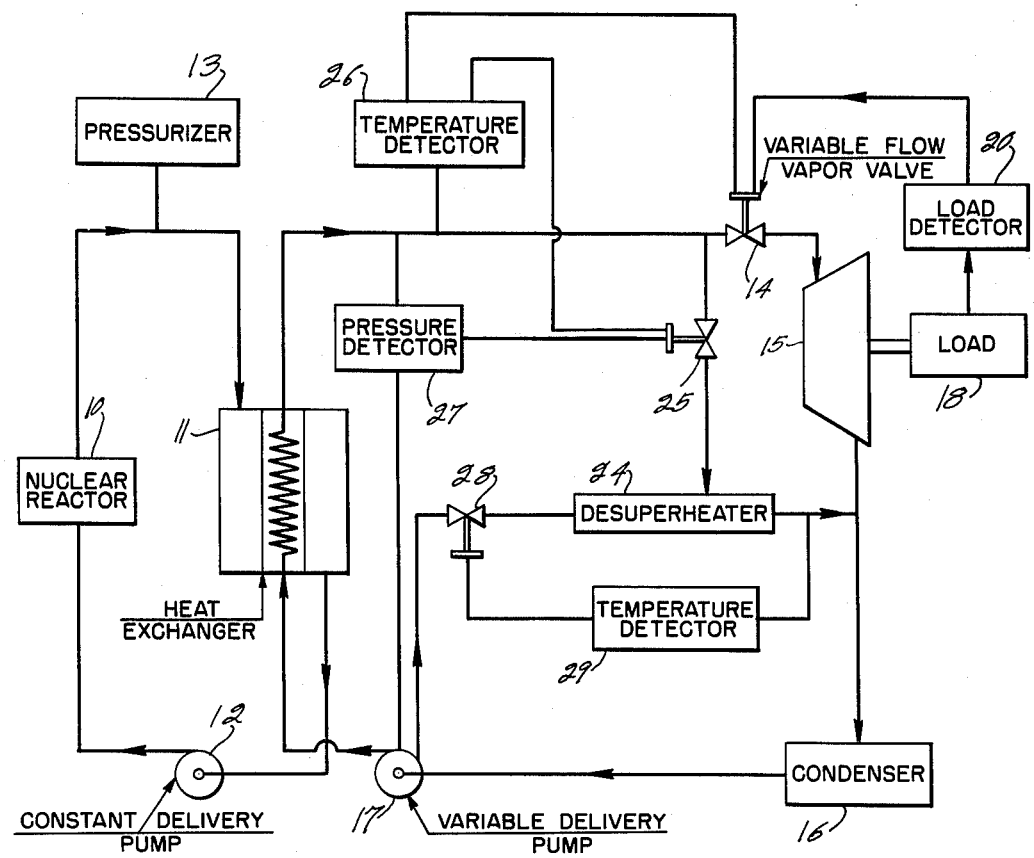

The embodiments illustrated in FIGURES 6 and 7 are constant working fluid pressure systems similar to the embodiments illustrated in FIGURES 1 and 3. The principal difference is the addition of certain safety and bypass mechanisms.

With reference to FIGURE 6, a bypass system is provided around the turbine that can be used during the startup of the steam generator before the turbine is started.

It should be noted that in this respect the bypass arrangement is not necessary in a recirculating boiler which may use the recirculating circuit as a bypass, but is necessary in a boiler of the once-through type to which the drawings relate. This bypass system includes a desuperheater 24 that is connected to the working fluid circuit conduit through a bypass variable flow vapor valve 25, and to the input of the condenser 16. A temperature detector 26 and a pressure detector 27 are both connected to the working fluid circuit conduit and actuate the variable flow vapor valve 14 and the bypass valve 25. These elements are connected so that the variable flow vapor valve 14 closes if the vapor temperature drops below a predetermined value, which indicates that water may be carried over to the turbine 15. The vapor valve 14 also acts in response to the pressure detector 27 to maintain the pressure in the working fluid circuit conduit constant, as explained with regard to FIGURE 1.

The bypass valve 25 is also connected to be responsive to the pressure detector 26 in such a manner that it will also open if the steam pressure exceeds a predetermined value. This latter connection is sometimes not necessary, however, depending upon the characteristics of the variable delivery pump 17 and the reactor 10. Also, if desired, the vapor valve 14 can be made to close and the bypass valve 25 to open if the temperature of the secondary vapor exceeds a predetermined limit.

In order to limit the temperature of the vapor entering the condenser 16 from the desuperheater 24 to a safe value, the desuperheater is connected to receive fluid from the pump 17 discharge through a valve 28 that is controlled, through a temperature detector 29, by the temperature of the fluid leaving the desuperheater 24. Instead of receiving cooling fluid from the pump 17 discharge, any other suitable source could be used for this purpose, one of them being the condensate leaving the condenser. In this instance, the conduit leading to the valve 28 could be connected to the output of the condenser 16 through a separate low pressure condensate pump rather than to the output of the variable delivery pump 17.

The embodiment of the invention illustrated in FIGURE 7 is similar to that illustrated in FIGURE 3 wherein the variable flow vapor valve 14 is connected to be responsive to a change in the load demand on the system and the variable delivery pump 17 is connected to be responsive to the pressure on the vapor in the conduit leading to the turbine. As in the embodiment illustrated in FIGURE 6, the bypass valve 25 is connected to be responsive to both the pressure and the temperature in the working fluid circuit and the vapor valve 14 is also connected for safety purposes to be responsive to the temperature in this conduit. The connections leading to the desuperheater may be identical with those illustrated in FIGURE 6.

It is apparent that bypass and control features similar to those described with respect to FIGURES 6 and 7 can also be provided for the embodiments of the invention illustrated in FIGURES 4 and 5. It should also be noted that for safety purposes, the bypass circuit may be useful in systems for boilers of both the recirculating type and once-through type.

While the rate of flow of the working fluid to the heat exchanger 11 has been shown as being controlled by a variable delivery pump, it is obvious that a constant flow pump can also be used in conjunction with a variable flow valve, and that other equivalent arrangements may be used.

As used in the specification and claims herein, the recitation "changing with variable fluid supply means" is defined as any operation wherein the flow of fluid is changed directly or indirectly in the working fluid circuit as, for example, by the direct control of the variable delivery pump 17 in response to the load detector 20 illustrated in FIG. 1, or the indirect control of the pump 17 shown in FIG. 3 by actuation of the variable flow vapor valve 14 in response to the load detector 20 and subsequent response of the pressure detector 19 to control the variable delivery pump 17.

It is apparent that a novel and useful control system for nuclear power plants has been provided. In each embodiment of the invention, a variation in the load demand on the system is compensated for, or a new power output is obtained by varying a characteristic of the fluid in the working fluid circuit which, in turn regulates the power output level of the nuclear reactor. In each embodiment of the invention, preferably the flow rate of the working fluid vapor and its heat content, are varied in response to a change in the load demand. In certain of the embodiments the pressure of the working fluid vapor is maintained constant while in other embodiments either the degree of superheat or the temperature of the working fluid is maintained constant. The choice of the embodiment of the invention to be used in each case will, of course, depend upon the characteristics of the load demand and the construction of the system. For example, it may be desirable to maintain the pressure in the working fluid circuit at a constant value in order to simplify the construction of the working fluid circuit components.

While representative embodiments of the present invention have been shown and described for purposes of illustration it is apparent that the embodiments are susceptible to change and modification without departing from this invention in its broader aspects. Therefore, the invention described herein is not to be construed as limited to the specific embodiments described, but is intended to encompass all modifications thereof coming within the scope of the following claims.

We claim:
1. A method for operating a nuclear power plant which includes a nuclear reactor having a negative temperature coefficient, a reactor coolant circuit, and a working fluid circuit including a power output device, said circuits being in communication with each other through heat exchanger means, comprising the steps of circulating reactor coolant through the reactor coolant circuit at a constant flow rate so as to maintain a constant average coolant temperature in the reactor, superheating the fluid in the working fluid circuit in the heat exchanger and transmitting it to the power output device in the superheated state, detecting a variation in the load demand on the power plant, and changing, by an amount representa- tive of the variation in the load demand in the direction to satisfy the demand, the flow rate of the fluid in the working fluid circuit with variable fluid supply means while controlling the pressure of the superheated fluid and maintaining substantially constant the level of reactivity of the nuclear reactor, the fluid in the reactor coolant circuit of the exchanger being in communication with the nuclear reactor, and the change in the flow rate of the fluid in the working fluid circuit acting through the fluid in the reactor coolant circuit to adjust the power level of the nuclear reactor.

2. A method for operating a nuclear power plant which includes a nuclear reactor having a negative temperature coefficient, a reactor coolant circuit, and a working fluid circuit including a power output device, said circuits being in communication with each other through heat exchanger means, comprising the steps of circulating reactor coolant through the reactor coolant circuit at a constant flow rate so as to maintain a constant average coolant temperature in the reactor, superheating the fluid in the working fluid circuit in the heat exchanger and transmitting it to the power output device in the superheated state, detecting a variation in the load demand on the power plant, and changing, by an amount representative of the variation in the load demand in the direction to satisfy the demand, the flow rate of the fluid in the working fluid circuit while controlling the pressure of the superheated fluid and maintaining substantially constant the level of reactivity of the nuclear reactor, the fluid in the reactor coolant circuit of the exchanger being in communication with the nuclear reactor, and the change in the flow rate of the fluid in the working fluid circuit acting through the fluid in the reactor coolant circuit to adjust the power level of the nuclear reactor, wherein the working fluid flow rate is changed by varying with valve means the rate of flow of superheated fluid from the heat exchanger means to the power output device in direct response to means detecting a variation in demand.

3. A method for operating a nuclear power plant which includes a nuclear reactor having a negative temperature coefficient, a reactor coolant circuit, and a working fluid circuit including a power output device, said circuits being in communication with each other through heat exchanger means, comprising the steps of circulating reactor coolant through the reactor coolant circuit at a constant flow rate so as to maintain a constant average coolant temperaure in the reactor, superheating the fluid in the working fluid circuit in the heat exchanger and transmitting it to the power output device in the superheated state, detecting a variation in the load demand on the power plant, and changing, by an amount representative of the variation in the load demand in the direction to satisfy the demand, the flow rate of the fluid in the working fluid circuit while controlling the pressure of the superheated fluid and maintaining substantially constant the level of reactivity of the nuclear reactor, the fluid in the reactor coolant circuit of the exchanger being in communication with the nuclear reactor, and the change in the flow rate of the fluid in the working fluid circuit acting through the fluid in the reactor coolant circuit to adjust the power level of the nuclear reactor, wherein the working fluid flow rate is changed by varying the rate of flow of superheated fluid from the heat exchanger means to the power output device in direct response to detection of a variation in demand, including the steps of detecting the pressure of the superheated fluid in the portion of the working fluid circuit between the heat exchanger means and the power output device, and controlling the rate of delivery of working fluid to the heat exchanger means so as to maintain the pressure in said portion of the working fluid circuit at a substantially constant level.

4. A method for operating a nuclear power plant which includes a nuclear reactor having a negative temperature coefficient, a reactor coolant circuit, and a working fluid circuit including a power output device, said circuits being in communication with each other through heat exchanger means, comprising the steps of circulating reactor coolant through the reactor coolant circuit at a constant flow rate so as to maintain a constant average coolant temperaure in the reactor, superheating the fluid in the working fluid circuit in the heat exchanger and transmitting it to the power output device in the superheated state, detecting a variation in the load demand on the power plant, and changing, by an amount representative of the variation in the load demand in the direction to satisfy the demand, the flow rate of the fluid in the working fluid circuit while controlling the pressure of the superheated fluid and maintaining substantially constant the level of reactivity of the nuclear reactor, the fluid in the reactor coolant circuit of the exchanger being in communication with the nuclear reactor, and the change in the flow rate of the fluid in the working fluid circuit acting through the fluid in the reactor coolant circuit to adjust the power level of the nuclear reactor, wherein the working fluid flow rate is changed by varying the rate of flow of superheated fluid from the heat exchanger means to the power output device in direct response to detection of a variation in demand, wherein the working fluid flow rate is changed by varying with pump means the rate of delivery of working fluid to the heat exchanger means in direct response to means detecting a variation in demand.

5. A method for operating a nuclear power plant which includes a nuclear reactor having a negative temperature coefficient, a reactor coolant circuit, and a working fluid circuit including a power output device, said circuits being in communication with each other through heat exchanger means, comprising the steps of circulating reactor coolant through the reactor coolant circuit at a constant flow rate so as to maintain a constant average coolant temperature in the reactor, superheating the fluid in the working fluid circuit in the heat exchanger and transmitting it to the power output device in the superheated state, detecting a variation in the load demand on the power plant, and changing, by an amount representative of the variation in the load demand in the direction to satisfy the demand, the flow rate of the fluid in the working fluid circuit while controlling the pressure of the superheated fluid and maintaining substantially constant the level of reactivity of the nuclear reactor, the fluid in the reactor coolant circuit of the exchanger being in communication with the nuclear reactor, and the change in the flow rate of the fluid in the working fluid circuit acting through the fluid in the reactor coolant circuit to adjust the power level of the nuclear reactor, wherein the working fluid flow rate is changed by varying the rate of delivery of working fluid to the heat exchanger means in direct response to detection of a variation in demand, including the steps of detecting the pressure of the superheated fluid in the portion of the working fluid circuit between the heat exchanger means and the power output device, and regulating the rate of application of the superheated fluid to the power output device so as to maintain the pressure in said portion of the working fluid circuit at a substantially constant level.

6. A method for operating a nuclear power plant which includes a nuclear reactor having a negative temperature coefficient, a reactor coolant circuit, and a working fluid circuit including a power output device, said circuits being in communication with each other through heat exchanger means, comprising the steps of circulating reactor coolant through the reactor coolant circuit at a constant flow rate so as to maintain a constant average coolant temperature in the reactor, superheating the fluid in the working fluid circuit in the heat exchanger and transmitting it to the power output device in the superheated state, detecting a variation in the load demand on the power plant, and changing, by an amount representative of the variation in the load demand in the direction to satisfy the demand, the flow rate of the fluid in the working fluid circuit with variable fluid supply means while controlling the degree of superheat of the superheated fluid so as to vary the amount of liquid working fluid within the heat exchanger and maintaining substantially constant the level of reactivity of the nuclear reactor, the fluid in the reactor coolant circuit of the exchanger being in communication with the nuclear reactor, and the change in the flow rate of the fluid in the working fluid circuit acting through the fluid in the reactor coolant circuit to adjust the power level of the nuclear reactor.

7. A method according to claim 6 wherein the working fluid flow rate is changed by varying with valve means the rate of flow of superheated fluid from the heat exchanger means to the power output device in direct response to means detecting a variation in demand.

8. A method according to claim 6 wherein the working fluid flow rate is changed by varying with pump means the rate of delivery of working fluid to the heat exchanger means in direct response to means detecting a variation in demand.

9. A method for operating a nuclear power plant which includes a nuclear reactor having a negative temperature coefficient, a reactor coolant circuit, and a working fluid circuit including a power output device, said circuits being in communication with each other through heat exchanger means, comprising the steps of circulating reactor coolant through the reactor coolant circuit at a constant flow rate so as to maintain a constant average coolant temperature in the reactor, superheating the fluid in the working fluid circuit in the heat exchanger and transmitting it to the power output device in the superheated state, detecting a variation in the load demand on the power plant, and changing, by an amount representative of the variation in the load demand in the direction to satisfy the demand, the flow rate of the fluid in the working fluid circuit with variable fluid supply means while controlling the temperature of the superheated fluid so as to vary the amount of liquid working fluid within the heat exchanger and maintaining substantially constant the level of reactivity of the nuclear reactor, the fluid in the reactor coolant circuit of the exchanger being in communication with the nuclear reactor, and the change in the flow rate of the fluid in the working fluid circuit acting through the fluid in the reactor coolant circuit to adjust the power level of the nuclear reactor.

10. A method according to claim 9 wherein the working fluid flow rate is changed by varying with valve means the rate of flow of superheated fluid from the heat exchanger means to the power output device in direct response to means detecting a variation in demand.

11. A method according to claim 9 wherein the working fluid flow rate is changed by varying with pump means the rate of delivery of working fluid to the heat exchanger means in direct response to means detecting a variation in demand.

12. A method for operating a nuclear power plant which includes a nuclear reactor having a negative temperature co-efficient, a reactor coolant circuit, and a working fluid circuit including a power output device, said circuits being in communication with each other through heat exchanger means, comprising the steps of circulating reactor coolant through the reactor coolant circuit at a constant flow rate so as to maintain a constant average coolant temperature in the reactor, superheating the fluid in the working fluid circuit in the heat exchanger and transmitting it to the power output device in the superheated state, detecting a variation in a characteristic of the working fluid, and changing, by an amount representative of the variation of the characteristic in the direction to satisfy the characteristic, the amount of liquid working fluid supplied to the heat exchanger with variable fluid supply means while maintaining substantially constant the level of reactivity of the nuclear reactor, and while independently controlling the pressure, and therefore the saturation temperature, of the working fluid within the heat exchanger, the fluid in the reactor coolant circuit of the exchanger being in communication with the nuclear reactor and the change in the amount of working fluid in the heat exchanger acting to cause a changed quantity of heat to be extracted from the reactor coolant passing through the heat exchanger, and thereby acting through the fluid in the reactor coolant circuit to adjust the power level of the nuclear reactor.

References Cited by the Examiner

Glasstone, "Principles of Nuclear Reactor Engineering," pp. 361, 772, 773, 1955, publ. by Van Nostrand Co., Inc.

Nucleonics, vol. 11, No. 6, June 1953, p. 54.

Proceedings of 1953 Conference on Nuclear Engineering (Univ. of Calif., Berkeley, Sept. 9–11, 1953) (pp. (D–1)–(D–9)), article by Schulz.

REUBEN EPSTEIN, *Primary Examiner.*

ROGER L. CAMPBELL, CARL D. QUARFORTH,
*Examiners.*